United States Patent
Pandey et al.

(10) Patent No.: US 11,835,764 B2
(45) Date of Patent: Dec. 5, 2023

(54) MULTIPLE-CORE HETEROGENEOUS WAVEGUIDE STRUCTURES INCLUDING MULTIPLE SLOTS

(71) Applicant: GlobalFoundries U.S. Inc., Malta, NY (US)

(72) Inventors: Shesh Mani Pandey, Saratoga Springs, NY (US); Yusheng Bian, Ballston Lake, NY (US); Judson Holt, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 73 days.

(21) Appl. No.: 17/588,440

(22) Filed: Jan. 31, 2022

(65) Prior Publication Data
US 2023/0244033 A1  Aug. 3, 2023

(51) Int. Cl.
*G02B 6/136* (2006.01)
*G02B 6/12* (2006.01)

(52) U.S. Cl.
CPC .... *G02B 6/136* (2013.01); *G02B 2006/12061* (2013.01)

(58) Field of Classification Search
CPC .............. G02B 6/136; G02B 2006/1061
See application file for complete search history.

(56) References Cited

U.S. PATENT DOCUMENTS

| | | | | |
|---|---|---|---|---|
| 6,571,035 B1 * | 5/2003 | Pi | ........... | G02B 6/12007 385/39 |
| 6,697,551 B2 * | 2/2004 | Lee | ........... | B82Y 20/00 385/132 |
| 7,289,694 B2 * | 10/2007 | Hochberg | ........... | B82Y 20/00 385/129 |
| 7,424,192 B2 * | 9/2008 | Hochberg | ........... | G02F 1/065 385/132 |
| 7,519,257 B2 * | 4/2009 | Lipson | ........... | G02B 6/1223 385/132 |
| 7,565,046 B2 * | 7/2009 | Feng | ........... | G02B 6/1223 385/28 |
| 7,643,714 B2 * | 1/2010 | Hochberg | ........... | B82Y 20/00 385/12 |

(Continued)

OTHER PUBLICATIONS

Wilmart Q. et al., "A Versatile Silicon-Silicon Nitride Photonics Platform for Enhanced Functionalities and Applications," Applied Sciences, 9, 255; DOI:10.3390/app9020255; pp. 1-16 (2019).

(Continued)

*Primary Examiner* — Andrew Jordan
(74) *Attorney, Agent, or Firm* — Thompson Hine LLP; Anthony Canale

(57) ABSTRACT

Waveguide structures and methods of fabricating a waveguide structure. The structure includes a first waveguide core, a second waveguide core, and a third waveguide core adjacent to the first waveguide core and the second waveguide core. The third waveguide core is laterally separated from the first waveguide core by a first slot, and the third waveguide core is laterally separated from the second waveguide core by a second slot. The first waveguide core and the second waveguide core comprise a first material, and the third waveguide core comprises a second material that is different in composition from the first material.

20 Claims, 4 Drawing Sheets

(56) References Cited

U.S. PATENT DOCUMENTS

| | | | | |
|---|---|---|---|---|
| 7,894,696 B2* | 2/2011 | Baehr-Jones | G02F 1/365 | 385/132 |
| 8,189,968 B2* | 5/2012 | Chen | B82Y 20/00 | 385/12 |
| 8,203,115 B2* | 6/2012 | Hochberg | G02B 6/12007 | 250/226 |
| 8,615,148 B2* | 12/2013 | Chen | G02B 6/1228 | 385/43 |
| 8,768,124 B2* | 7/2014 | Van Keuren | G02B 6/125 | 385/39 |
| 8,791,405 B2* | 7/2014 | Ji | G02B 6/124 | 250/239 |
| 8,798,406 B1* | 8/2014 | Hochberg | B82Y 20/00 | 385/2 |
| 8,895,413 B2 | 11/2014 | Pinguet et al. | | |
| 9,040,919 B2* | 5/2015 | Darcie | G02B 6/102 | 250/353 |
| 9,285,304 B2* | 3/2016 | Jardinier | G01N 21/31 | |
| 9,310,558 B2* | 4/2016 | Huang | G02B 6/12002 | |
| 9,502,069 B2* | 11/2016 | Peng | G11B 7/22 | |
| 9,759,864 B2* | 9/2017 | Painchaud | G02B 6/00 | |
| 9,864,138 B2* | 1/2018 | Coolbaugh | G02B 6/13 | |
| 9,874,691 B2* | 1/2018 | Mahgerefteh | G02B 6/126 | |
| 10,156,676 B1* | 12/2018 | Shank | H01L 31/1136 | |
| 10,197,734 B2* | 2/2019 | Painchaud | G02B 6/125 | |
| 10,295,745 B2* | 5/2019 | Coolbaugh | H01L 21/02381 | |
| 10,429,582 B1* | 10/2019 | Bian | G02B 6/12002 | |
| 10,436,982 B1* | 10/2019 | Bian | G02B 6/13 | |
| 10,571,631 B2* | 2/2020 | Coolbaugh | H01L 21/02532 | |
| 10,641,956 B1* | 5/2020 | Bian | G02B 6/43 | |
| 10,656,333 B2* | 5/2020 | Mahgerefteh | G02B 6/126 | |
| 10,698,156 B2* | 6/2020 | Coolbaugh | G02B 6/4232 | |
| 10,816,724 B2* | 10/2020 | Coolbaugh | G02B 6/122 | |
| 10,830,952 B2* | 11/2020 | Coolbaugh | H01L 21/2053 | |
| 10,877,300 B2* | 12/2020 | Coolbaugh | G02B 6/12 | |
| 10,884,313 B2* | 1/2021 | Gould | G02B 6/3508 | |
| 10,976,491 B2* | 4/2021 | Coolbaugh | G02B 6/136 | |
| 10,996,398 B1* | 5/2021 | Bian | G02B 6/2773 | |
| 11,029,466 B2* | 6/2021 | Charles | G02B 6/136 | |
| 11,067,751 B2 | 7/2021 | Meagher et al. | | |
| 11,092,740 B1* | 8/2021 | Bian | G02B 6/126 | |
| 11,181,693 B1* | 11/2021 | Bian | G02B 6/2852 | |
| 11,256,029 B2* | 2/2022 | Kannan | G02B 6/13 | |
| 11,281,068 B2* | 3/2022 | Gould | G02B 6/1223 | |
| 11,378,739 B2* | 7/2022 | Coolbaugh | H01L 21/76202 | |
| 11,409,037 B2 | 8/2022 | Bian et al. | | |
| 11,422,305 B2* | 8/2022 | Liu | G02B 6/13 | |
| 11,435,523 B2* | 9/2022 | Coolbaugh | H01L 27/1266 | |
| 11,448,822 B2 | 9/2022 | Holt et al. | | |
| 11,493,686 B2* | 11/2022 | Bian | G02B 6/122 | |
| 11,531,159 B2* | 12/2022 | Chern | G02B 6/1228 | |
| 11,550,099 B2* | 1/2023 | Charles | H01S 5/1032 | |
| 11,550,173 B2* | 1/2023 | Coolbaugh | G02F 1/095 | |
| 11,635,568 B2* | 4/2023 | Coolbaugh | H01L 21/76202 | 385/14 |
| 11,650,381 B1* | 5/2023 | Polomoff | G02B 6/30 | 385/49 |
| 2004/0087049 A1* | 5/2004 | Gill | G02B 6/12007 | 438/31 |
| 2005/0135739 A1* | 6/2005 | Kim | G02B 6/1228 | 385/28 |
| 2006/0228074 A1* | 10/2006 | Lipson | B82Y 20/00 | 385/39 |
| 2007/0114628 A1* | 5/2007 | Barrios | H01S 5/1071 | 257/432 |
| 2008/0002992 A1* | 1/2008 | Hochberg | G02B 6/1223 | 385/132 |
| 2008/0152279 A1* | 6/2008 | Feng | G02B 6/1223 | 385/28 |
| 2009/0022445 A1* | 1/2009 | Hochberg | G02F 1/065 | 359/278 |
| 2009/0297094 A1* | 12/2009 | Hochberg | B82Y 20/00 | 385/14 |
| 2010/0002994 A1* | 1/2010 | Baehr-Jones | G02F 1/365 | 385/32 |
| 2010/0187402 A1* | 7/2010 | Hochberg | G02B 6/12004 | 250/208.1 |
| 2011/0069969 A1* | 3/2011 | Hochberg | G02F 3/024 | 398/141 |
| 2011/0133063 A1* | 6/2011 | Ji | G02B 6/124 | 250/227.24 |
| 2011/0206323 A1* | 8/2011 | Zhang | G02B 6/12007 | 427/163.2 |
| 2011/0317960 A1* | 12/2011 | Van Keuren | G02B 6/125 | 385/39 |
| 2012/0132993 A1* | 5/2012 | Pinguet | H01L 21/84 | 257/351 |
| 2013/0051727 A1* | 2/2013 | Mizrahi | G02B 6/26 | 385/28 |
| 2014/0233901 A1* | 8/2014 | Hatori | G02B 6/43 | 385/129 |
| 2014/0294341 A1 | 10/2014 | Hatori et al. | | |
| 2015/0378097 A1* | 12/2015 | Mizrahi | H01S 5/026 | 427/163.2 |
| 2016/0380121 A1* | 12/2016 | Suzuki | H01L 31/028 | 257/29 |
| 2017/0052317 A1* | 2/2017 | Mahgerefteh | G02B 6/274 | |
| 2018/0292605 A1* | 10/2018 | An | G02B 6/0036 | |
| 2019/0227230 A1* | 7/2019 | Novack | G02B 6/124 | |
| 2019/0243066 A1* | 8/2019 | Mahgerefteh | G02B 6/1223 | |
| 2020/0026000 A1* | 1/2020 | Bian | G02B 6/107 | |
| 2020/0116930 A1* | 4/2020 | Kannan | G02B 6/122 | |
| 2021/0109283 A1* | 4/2021 | Meagher | G02B 6/122 | |
| 2021/0263348 A1 | 8/2021 | Shank et al. | | |
| 2022/0075130 A1* | 3/2022 | Krasulick | H01S 5/026 | |
| 2022/0229250 A1* | 7/2022 | Bian | G02B 6/0046 | |
| 2022/0326434 A1* | 10/2022 | Bian | G02B 6/122 | |
| 2022/0390693 A1* | 12/2022 | Krähenbühl | G02B 6/30 | |
| 2023/0101580 A1 | 3/2023 | Cucci et al. | | |
| 2023/0130467 A1* | 4/2023 | Polomoff | G02B 6/4249 | 385/14 |
| 2023/0244033 A1* | 8/2023 | Pandey | G02B 6/136 | 385/14 |

OTHER PUBLICATIONS

Shankar Kumar Selvaraja et al., "Review on Optical Waveguides,"; http://dx.doi.org/10.5772/intechopen.77150, IntechOpen, Chapter 6, Emerging Waveguide Technology; pp. 96-129 (2018).

Barrios, C. A. et al., "Demonstration of slot-waveguide structures on silicon nitride / silicon oxide platform," Optics Express 15, pp. 6846-6856 (2007).

Vladimir Stojanovic et al., "Monolithic silicon-photonic platforms in state-of-the-art CMOS SOI processes [Invited]," Optics Express, vol. 26, No. 10, pp. 13106-13121 (May 14, 2018).

K Giewont et al., "300-mm Monolithic Silicon Photonics Foundry Technology," in IEEE Journal of Selected Topics in Quantum Electronics, vol. 25, No. 5, pp. 1-11, doi: 10.1109/JSTQE.2019.2908790 (Sep.-Oct. 2019).

M. Rakowski et al., "45nm CMOS—Silicon Photonics Monolithic Technology (45CLO) for next-generation, low power and high speed optical interconnects," in Optical Fiber Communication Conference (OFC), OSA Technical Digest (Optical Society of America, 2020), paper T3H.3 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2 (2020).

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optical Society of America, 2021), paper Th1A.46 (2021).

Aurent Vivien et al., "Vertical multiple-slot waveguide ring resonators in silicon nitride," Optics Express 16, 17237-17242 (2008).

(56) References Cited

OTHER PUBLICATIONS

European Patent Office, Extended European Search Report and Written Opinion issued in European Patent Application No. 22200137.2 dated Jun. 19, 2023 (8 pages).

* cited by examiner

MULTIPLE-CORE HETEROGENEOUS WAVEGUIDE STRUCTURES INCLUDING MULTIPLE SLOTS

BACKGROUND

This disclosure relates to photonics chips and, more specifically, to waveguide structures and methods of fabricating a waveguide structure.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

Improved waveguide structures and methods of fabricating a waveguide structure are needed.

SUMMARY

In an embodiment of the invention, a structure includes a first waveguide core, a second waveguide core, and a third waveguide core adjacent to the first waveguide core and the second waveguide core. The third waveguide core is laterally separated from the first waveguide core by a first slot, and the third waveguide core is laterally separated from the second waveguide core by a second slot. The first waveguide core and the second waveguide core comprise a first material, and the third waveguide core comprises a second material that is different in composition from the first material.

In an embodiment of the invention, a method includes forming a first waveguide core and a second waveguide core that comprise a first material, and forming a third waveguide core that comprises a second material different in composition from the first material. The third waveguide core is positioned adjacent to the first waveguide core and the second waveguide core, the third waveguide core is laterally separated from the first waveguide core by a first slot, and the third waveguide core is laterally separated from the second waveguide core by a second slot.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
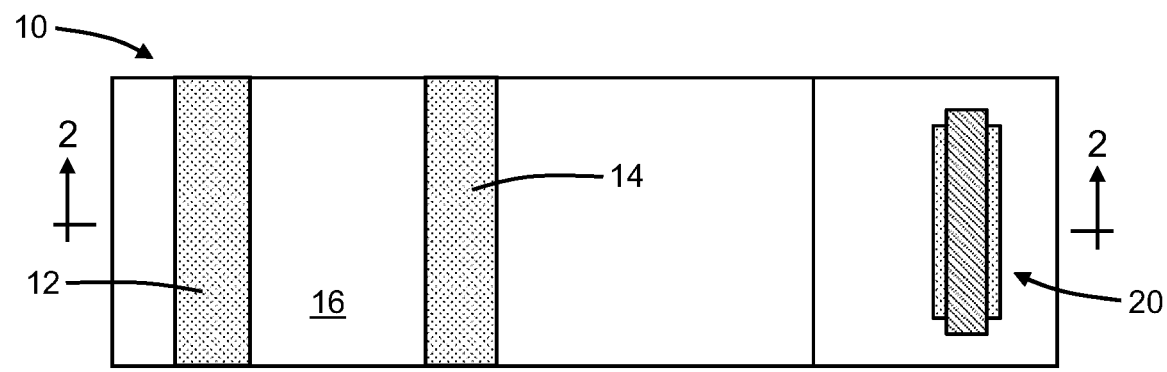
FIG. 1 is a top view of a waveguide structure at an initial fabrication stage of a processing method in accordance with embodiments of the invention.
Figure 2:
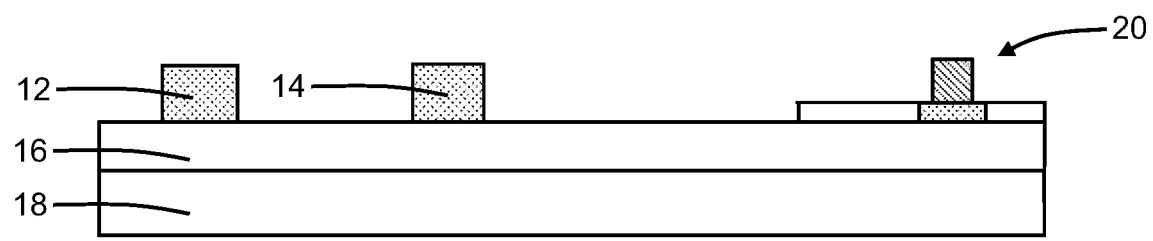
FIG. 2 is a cross-sectional view taken generally along line 2-2 in FIG. 1.

With reference to FIGS. 1, 2 and in accordance with embodiments of the invention, a waveguide structure 10 includes a waveguide cores 12, 14 that are positioned over a dielectric layer 16. The waveguide cores 12, 14 may be comprised of a high refractive-index material. In an embodiment, the waveguide cores 12, 14 may be comprised of a semiconductor material, such as single-crystal silicon patterned by lithography and etching processes from a device layer of a silicon-on-insulator substrate. The silicon-on-insulator substrate further includes a buried insulator layer comprised of a dielectric material, such as silicon dioxide, that may provide the dielectric layer 16 and a handle substrate 18 comprised of a semiconductor material, such as single-crystal silicon, beneath the buried insulator layer.

The waveguide cores 12, 14 may be located in a region of a monolithic photonics chip. A field-effect transistor, diagrammatically indicated by reference numeral 20, may be located in a different region of the monolithic photonics chip. The field-effect transistor 20 may be formed using the same semiconductor layer used to form the waveguide cores 12, 14. Alternatively, the waveguide cores 12, 14 may be located in a region of a standalone photonics chip.

Figure 3:
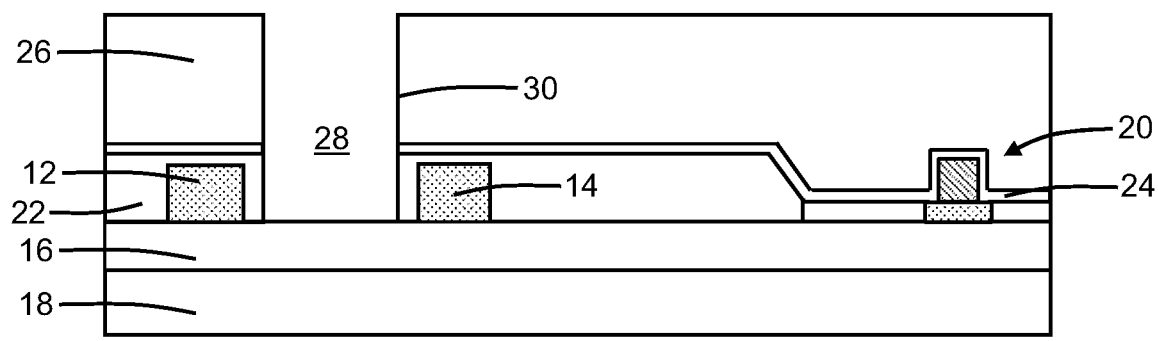
FIGS. 3-4 are cross-sectional views of the waveguide structure at successive fabrication stages subsequent to FIG. 2.

With reference to FIG. 3 in which like reference numerals refer to like features in FIG. 2 and at a subsequent fabrication stage, a dielectric layer 22 is formed over the waveguide cores 12, 14. The dielectric layer 22 may be comprised of a dielectric material, such as silicon dioxide, that is deposited and then polished to remove topography. The thickness of the dielectric layer 22 may be greater than the thickness of the waveguide cores 12, 14 such that the waveguide cores 12, 14 are embedded in the dielectric layer 22. A dielectric layer 24 is formed that extends across the field-effect transistor 20 and that deposits on the dielectric layer 22. The dielectric layer 24 may be comprised of a dielectric material, such as silicon nitride, and may be conformally deposited.

A dielectric layer 26 of a contact level may be formed by middle-of-line processing. The dielectric layer 26 may be comprised of a dielectric material, such as silicon dioxide, and may include contacts that are connected to the field-effect transistor 20.

A trench 28 may be patterned that extends through the dielectric layers 22, 24, 26 to the dielectric layer 16. In an embodiment, the trench 28 may extend fully through the dielectric layers 22, 24, 26 to the dielectric layer 16. The waveguide core 12 is laterally spaced from the waveguide core 14 such that the trench 28 does not overlap with either of the waveguide cores 12, 14. A thickness of the dielectric material of the dielectric layer 22 is positioned between each of the waveguide cores 12, 14 and a sidewall 30 surrounding the trench 28.

Figure 4:
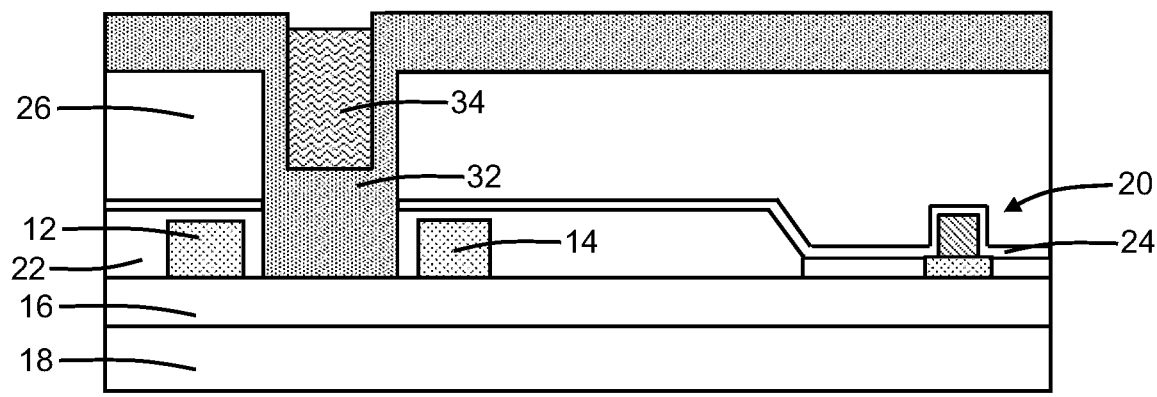

With reference to FIG. 4 in which like reference numerals refer to like features in FIG. 3 and at a subsequent fabrication stage, a dielectric layer 32 may be deposited inside the trench 28. The dielectric layer 32, which is comprised of a dielectric material, includes a divot that may be filled by an etch mask 34, such as a photoresist. In an embodiment, the dielectric layer 32 may be comprised of silicon nitride.

Figure 5:
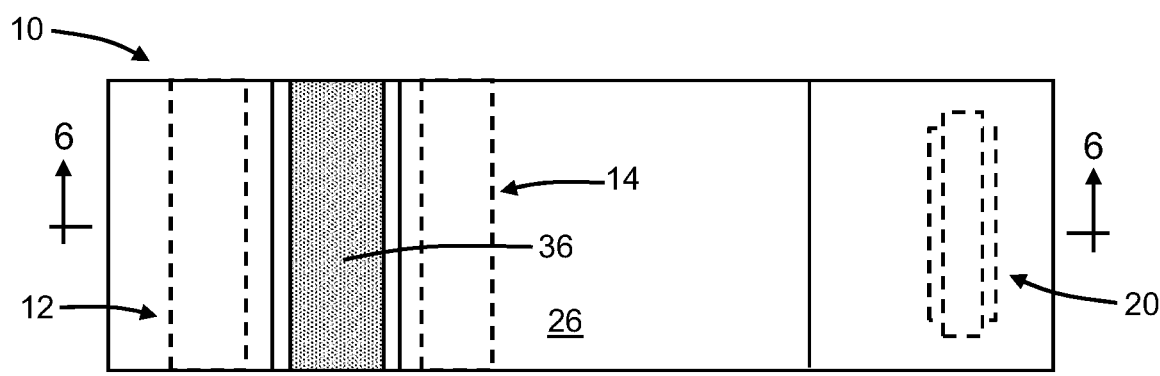
FIG. 5 is a top view of the waveguide structure at a fabrication stage subsequent to FIG. 4.
Figure 6:
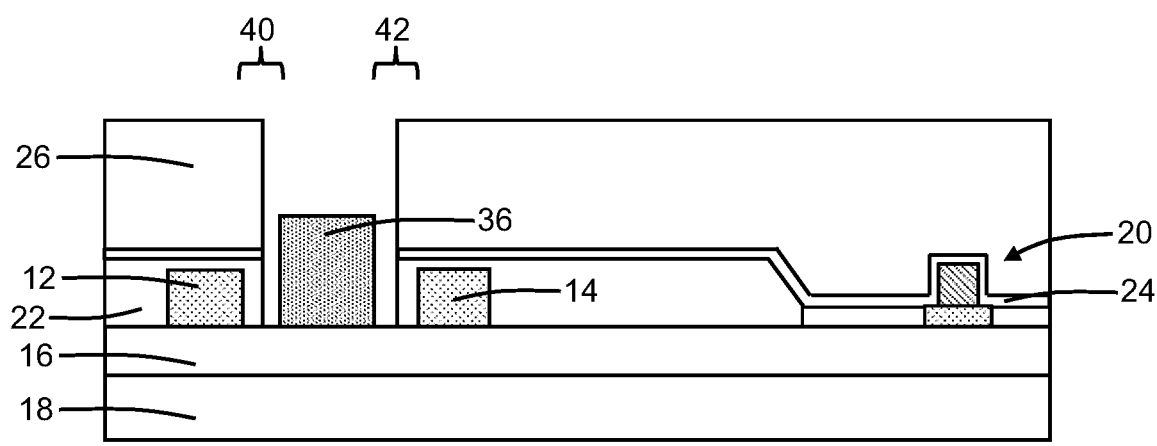
FIG. 6 is a cross-sectional view taken generally along line 6-6 in FIG. 5.

With reference to FIGS. 5, 6 in which like reference numerals refer to like features in FIG. 4 and at a subsequent fabrication stage, a waveguide core 36 may be formed inside the trench 28 from the dielectric layer 32 by an etching process. The portion of the dielectric layer 32 that is masked by the etch mask 34 provides the waveguide core 36 following the etching process. After patterning the waveguide core 36, the etch mask 34 may be removed.

The waveguide core 12 is positioned adjacent to the waveguide core 36, and the waveguide core 14 is also positioned adjacent to the waveguide core 36. The waveguide core 36 is positioned laterally between the waveguide core 12 and the waveguide core 14. The waveguide core 36 is laterally spaced from the waveguide core 12 by a slot 40, and the waveguide core 36 is laterally spaced from the waveguide core 14 by a slot 42. The slot 40 may have a width dimension measured between the nearest sidewalls of the waveguide core 12 and the waveguide core 36, the slot 42 may have a width dimension measured between the nearest sidewalls of the waveguide core 14 and the waveguide core 36, and the width dimensions may range in value from 20 nanometers to 2 microns. In an embodiment, the waveguide core 36 may be symmetrically positioned between the waveguide core 12 and the waveguide core 14 such that the slots 40, 42 have equal or substantially equal width dimensions.

The waveguide core 12 has a bottom surface 13 that may be in direct contact with the dielectric layer 16, and the waveguide core 14 has a bottom surface 15 that may be in direct contact with the dielectric layer 16. The waveguide core 36 has a bottom surface 37 that may also be in direct contact with the dielectric layer 16. The waveguide cores 12, 14 and the waveguide core 36 may be considered to be arranged at the same level of the waveguide structure 10 because the respective bottom surfaces 13, 15, 37 may all be in direct contact with the same planar surface of the dielectric layer 16. As a result of the common reference plane defined by the dielectric layer 16, the bottom surfaces 13, 15, 37 may be coplanar.

Figure 7:
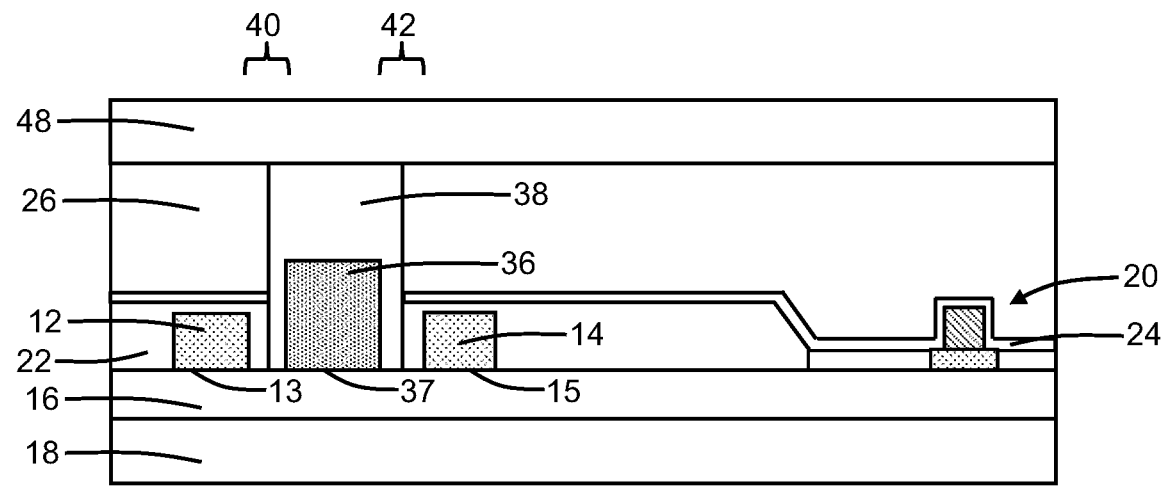
FIG. 7 is a cross-sectional view of the waveguide structure at a fabrication stage subsequent to FIG. 6.

With reference to FIG. 7 in which like reference numerals refer to like features in FIG. 6 and at a subsequent fabrication stage, a dielectric layer 38 may be subsequently deposited and planarized to refill the open space remaining in the trench 28, after the formation of the waveguide core 36, with dielectric material. In an embodiment, the dielectric material of the dielectric layer 38 may be comprised of silicon dioxide. Each of the slots 40, 42 is filled in part by the dielectric material of the dielectric layer 22 and in part by the dielectric material of the dielectric layer 38. The dielectric materials of the dielectric layers 22, 38, which may be the same dielectric material, may differ in composition from the materials of the waveguide cores 12, 14, 36. In an embodiment, the dielectric material filling the slots 40, 42 has a lower refractive index than the materials of the waveguide cores 12, 14, 36.

A back-end-of-line stack 48 may be formed by back-end-of-line processing over the dielectric layers 22, 38. The back-end-of-line stack 48 may include one or more interlayer dielectric layers each comprised of a dielectric material, such as silicon dioxide or silicon nitride. The back-end-of-line stack 48 may also include metal lines, vias, and contacts that are connected to the field-effect transistor 20.

The waveguide structure 10 is heterogeneous in that the waveguide cores 12, 14 are comprised of a different material than the waveguide core 36. In the representative embodiment, the waveguide cores 12, 14 are comprised of a semiconductor material (e.g., silicon), and the waveguide core 36 is comprised of a dielectric material (e.g., silicon nitride). The waveguide structure 10 includes multiple waveguide cores 12, 14, 36 with lateral positioning and multiple slots laterally between the waveguide cores 12, 14, 36 of alternating composition. In the representative embodiment, the waveguide structure 10 including the waveguide cores 12, 14, 36 has a dual-slot configuration. In alternative embodiments, the number of waveguide cores of alternating composition and the number slots may be greater than included in the representative embodiment. In alternative embodiments, the alternating materials may be extended to include other combinations of alternating materials, such as silicon oxynitride and silicon nitride, silicon and silicon oxynitride, etc., as well as other material systems such as III-V compound semiconductor material systems and polymer material systems.

The heterogeneous, multiple-slot waveguide structure 10 may support well-confined photonic modes and can serve as a building block for functional optical components. The heterogeneous, multiple-slot waveguide structure 10 may exhibit a significantly reduced power ratio inside the waveguide cores 12, 14 for improved power handling. The addition of the waveguide core 36 and the slots 40, 42 may, in combination, reduce the power density of the waveguide structure 10, which may increase the nonlinear threshold. The selection of silicon nitride as a material for the waveguide core 36 may be effective to increase the power handling and reduce the thermal sensitivity of the waveguide structure 10.

Figure 8:
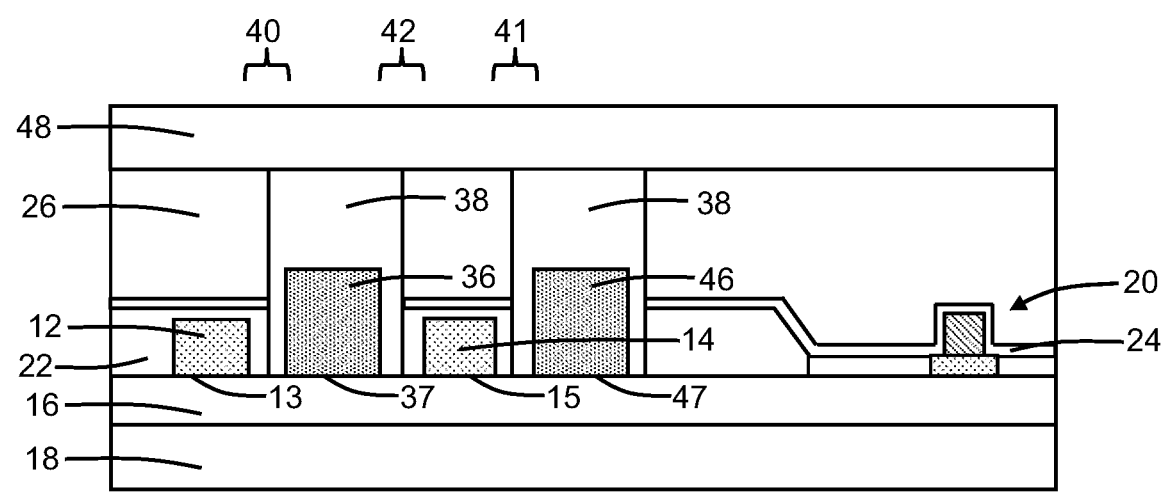
FIGS. 8 and 9 are cross-sectional views of structures in accordance with alternative embodiments of the invention.

With reference to FIG. 8 in which like reference numerals refer to like features in FIG. 7 and in accordance with alternative embodiments of the invention, the waveguide structure 10 may be modified to add another waveguide core 46 that is positioned on the dielectric layer 16 adjacent to the waveguide core 14. The waveguide core 46 may be comprised of the same material as the waveguide core 36. In an embodiment, the waveguide core 46 may be comprised of silicon nitride. The waveguide core 46 may be formed by patterning a trench similar to the trench 28 and then by patterning the dielectric layer 32 deposited in this additional trench.

The waveguide core 14 is positioned laterally between the waveguide core 36 and the waveguide core 46. The waveguide core 46 is laterally spaced from the waveguide core 14 by a slot 41 that is filled in part by the dielectric material of the dielectric layer 22 and in part by the dielectric material of the dielectric layer 38. The slot 41 may have a width dimension measured between the nearest sidewalls of the waveguide core 14 and the waveguide core 46, and the width dimension may range in value from 20 nanometers to 2 microns. The waveguide core 46 has a bottom surface 47 that may also be in direct contact with the dielectric layer 16. The waveguide cores 12, 14 and the waveguide cores 36, 46 may be considered to be arranged at the same level of the waveguide structure 10 because the respective bottom surfaces 13, 15, 37, 47 may be in direct contact with the same planar surface of the dielectric layer 16. As a result of the common reference plane defined by the dielectric layer 16, the bottom surfaces 13, 15, 37, 47 may be coplanar.

Figure 9:
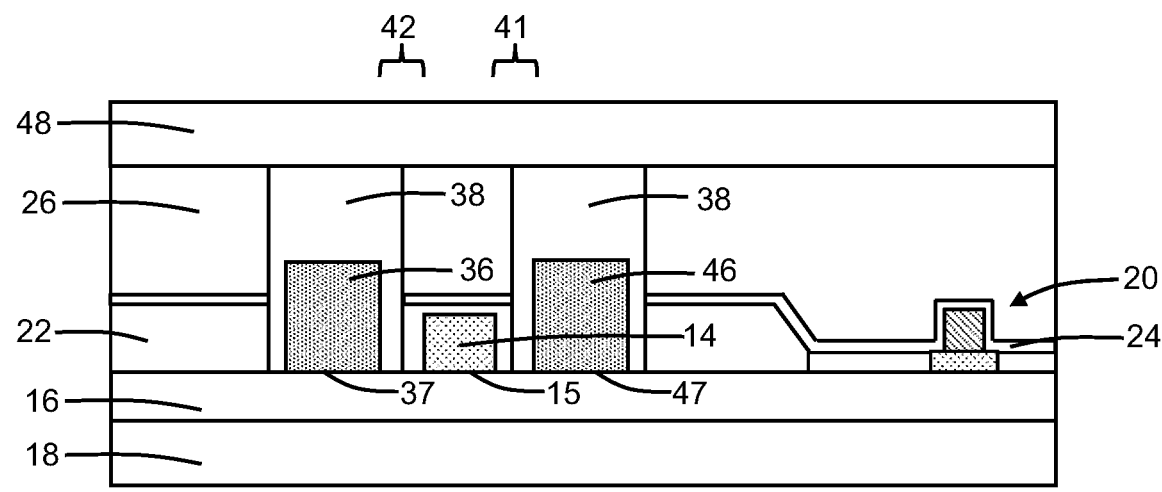

With reference to FIG. 9 in which like reference numerals refer to like features in FIG. 8 and in accordance with alternative embodiments of the invention, the waveguide structure 10 may be modified to eliminate the waveguide core 12 such that the waveguide core 14 and the waveguide cores 36, 46 remain. The waveguide structure 10 includes slots 41, 42, and the materials of the waveguide cores 14, 36, 46 alternate laterally.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    a first waveguide core;
    a second waveguide core; and
    a third waveguide core adjacent to the first waveguide core and the second waveguide core, the third waveguide core laterally separated from the first waveguide core by a first slot, the third waveguide core laterally separated from the second waveguide core by a second slot,
    wherein the first waveguide core and the second waveguide core comprise a first material, and the third waveguide core comprises a second material that is different in composition from the first material.

2. The structure of claim 1 wherein the first material is a dielectric material, and the second material is a semiconductor material.

3. The structure of claim 2 wherein the semiconductor material is silicon, and the dielectric material is silicon nitride.

4. The structure of claim 2 wherein the dielectric material is silicon nitride, and the semiconductor material is silicon.

5. The structure of claim 1 wherein the first material is a semiconductor material, and the second material is a dielectric material.

6. The structure of claim 1 further comprising:
    a fourth waveguide core adjacent to the second waveguide core, the fourth waveguide core laterally separated from the second waveguide core by a third slot, and the fourth waveguide core comprising the second material.

7. The structure of claim 6 wherein the first material is a dielectric material, and the second material is a semiconductor material.

8. The structure of claim 7 wherein the dielectric material is silicon nitride, and the semiconductor material is silicon.

9. The structure of claim 1 wherein the third waveguide core is fully separated from the first waveguide core by the first slot, and the third waveguide core is fully separated from the second waveguide core by the second slot.

10. The structure of claim 9 wherein the first slot and the second slot are filled by a third material that differs in composition from the first material and the second material.

11. The structure of claim 9 wherein the first slot and the second slot are filled by a third material having a lower refractive index than the first material and the second material.

12. The structure of claim 1 further comprising:
    a dielectric layer,
    wherein the first waveguide core includes a first surface in direct contact with the dielectric layer, the second waveguide core includes a second surface in direct contact with the dielectric layer, and the third waveguide core includes a third surface in direct contact with the dielectric layer.

13. The structure of claim 12 wherein the first surface, the second surface, and the third surface are coplanar.

14. The structure of claim 1 wherein the third waveguide core is symmetrically positioned relative to the first waveguide core and the second waveguide core such that the first slot and the second slot have equal width dimensions.

15. A method comprising:
    forming a first waveguide core and a second waveguide core that comprise a first material; and
    forming a third waveguide core that comprises a second material different in composition from the first material,
    wherein the third waveguide core is positioned adjacent to the first waveguide core and the second waveguide core, the third waveguide core is laterally separated from the first waveguide core by a first slot, and the third waveguide core is laterally separated from the second waveguide core by a second slot.

16. The method of claim 15 wherein the third waveguide core is formed before the first waveguide core and the second waveguide core are formed, the first material is silicon nitride, and the second material is silicon.

17. The method of claim 15 wherein the third waveguide core is formed after the first waveguide core and the second waveguide core are formed, the first material is silicon, and the second material is silicon nitride.

18. The method of claim 15 wherein the first waveguide core includes a first surface in direct contact with a dielectric layer, the second waveguide core includes a second surface in direct contact with the dielectric layer, the third waveguide core includes a third surface in direct contact with the dielectric layer, and the first surface, the second surface, and the third surface are coplanar.

19. The method of claim 15 wherein the third waveguide core is fully separated from the first waveguide core by the first slot, and the third waveguide core is fully separated from the second waveguide core by the second slot.

20. The method of claim 19 wherein the first slot and the second slot are filled by a third material that differs in composition from the first material and the second material and that has a lower refractive index than the first material and the second material.

\* \* \* \* \*